(12) United States Patent
Christensen et al.

(10) Patent No.: US 7,406,220 B1
(45) Date of Patent: Jul. 29, 2008

(54) BEAM STEERING AND COMBINATION

(75) Inventors: Scott E. Christensen, Boulder, CO (US); Iain T. McKinnie, Denver, CO (US)

(73) Assignee: Lockheed Martin Coherent Technologies, Inc., Louisville, CO (US)

(*) Notice: Subject to any disclaimer, the term of this patent is extended or adjusted under 35 U.S.C. 154(b) by 0 days.

(21) Appl. No.: 11/819,202

(22) Filed: Jun. 26, 2007

Related U.S. Application Data

(63) Continuation-in-part of application No. 11/372,420, filed on Mar. 9, 2006, now Pat. No. 7,239,777, and a continuation-in-part of application No. 11/371,891, filed on Mar. 9, 2006, now Pat. No. 7,313,299.

(51) Int. Cl.
*G02B 6/26* (2006.01)
(52) U.S. Cl. .............................. 385/27; 385/8; 385/28; 385/43
(58) Field of Classification Search .................. 385/27, 385/28, 29, 39, 46, 58, 2, 8; 372/6, 9, 26, 372/31; 359/333, 349
See application file for complete search history.

(56) References Cited

U.S. PATENT DOCUMENTS

2003/0063884 A1* 4/2003 Smith et al. .................. 385/129
2007/0201795 A1* 8/2007 Rice et al. ..................... 385/39

* cited by examiner

*Primary Examiner*—Hemang Sanghavi
(74) *Attorney, Agent, or Firm*—McDermott Will & Emery LLP

(57) ABSTRACT

Systems and methods for steering at least one of two or more optical input beams and forming a combined optical output beam are disclosed. A system has a waveguide, one or more phase controlling devices and one or more beam steering devices. The waveguide is configured to combine the optical input beams. The one or more phase controlling devices are configured to control a phase of at least one of the optical input beams. The system can form a coherently combined optical output beam. The one or more beam steering devices are configured to laterally steer, angularly steer, or laterally and angularly steer at least one of the optical input beams. The waveguide, in conjunction with the one or more beam steering devices, is configured to form the combined optical output beam that is angularly steered, laterally steered, or angularly and laterally steered.

19 Claims, 8 Drawing Sheets

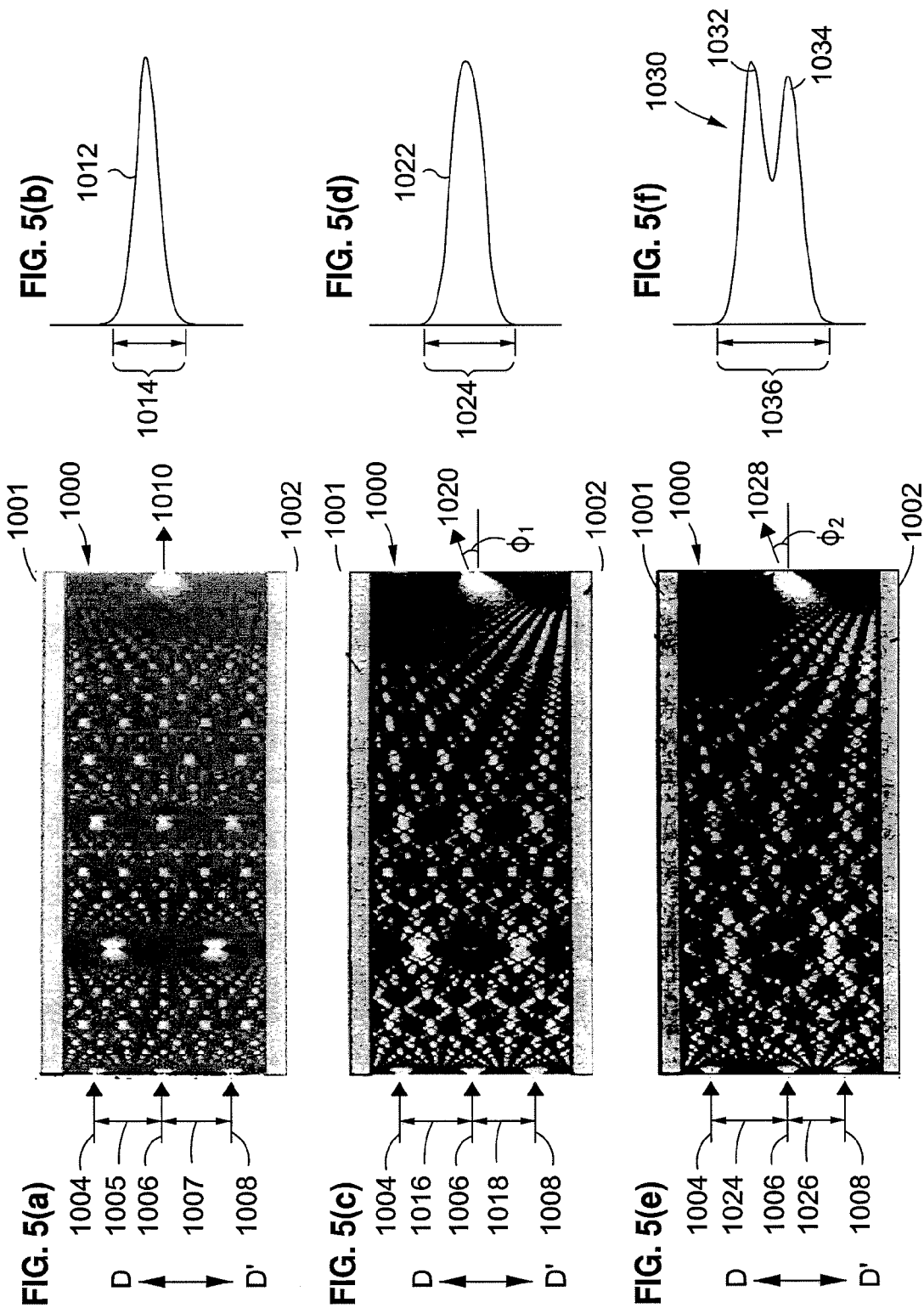

BEAM STEERING AND COMBINATION

CROSS-REFERENCE TO RELATED APPLICATIONS

This application is a continuation-in-part of U.S. patent application Ser. No. 11/372,420, filed Mar. 9, 2006, and issued as U.S. Pat. No. 7,239,777, and is also a continuation-in-part of U.S. patent application Ser. No. 11/371,891, filed Mar. 9, 2006, and issued as U.S. Pat. No. 7,313,299, all of which are hereby incorporated by reference in their entirety for all purposes.

STATEMENT AS TO RIGHTS TO INVENTIONS MADE UNDER FEDERALLY SPONSORED RESEARCH OR DEVELOPMENT

Not Applicable.

FIELD OF THE INVENTION

The present invention generally relates to optical beam controls and, in particular, relates to systems and methods for beam steering and combination.

BACKGROUND OF THE INVENTION

High power optical beams, such as those produced by lasers, are used for applications such as long range laser detection and ranging ("LADAR"), directed energy weapons, or other high power laser applications. High power lasers typically have optical output beams with over 1 kilowatt (kW) of power, and can have optical output beam powers that reach the hundreds of kilowatts or even megawatts. One difficulty in creating laser beams of very high powers is that beam quality typically degrades as laser power levels are increased. This degradation with increasing power is frequently a consequence of thermally induced distortions. Poor beam quality causes the laser area at a target to be larger than a non-distorted beam. Efforts have been made to combine the outputs from multiple lower power lasers into a single high power beam to achieve both high power and minimize degradation of beam quality.

Beam control remains one of the most significant challenges for deployment of high power laser systems for LADAR, directed energy weapons, or other high laser power applications. Typically, beam-steering and control has been achieved by the use of bulky, mechanical gimbal beam directors. For example, the airborne laser ("ABL") turret and the ground-based high energy laser system terrestrial facility ("HELSTF") beam directors have traditionally relied on such mechanical gimbal beam directors. These beam control systems are separate from the high power laser itself, thus adding considerable size, weight, and power considerations to already unwieldy systems that are challenging to deploy. In addition, because of their large size, traditional mechanical beam directors do not have as fast a response as desired, particularly for applications such as LADAR, ABL and HELSTF. Although electronic beam steering techniques have recently been developed, such techniques are presently limited by low damage thresholds of components and very low throughput. Thus, such techniques are unsuitable for high power systems.

SUMMARY OF THE INVENTION

The present invention provides novel systems and methods for steering and combining optical beams. In various embodiments of the present invention, systems and methods are provided for steering one or more optical input beams and combining optical input beams to produce a coherent optical output beam that is steered laterally, angularly or a combination thereof. In one aspect, the present invention provides systems and methods for rapid angular or lateral beam steering for use in high power lasers.

In an exemplary embodiment of the present invention, a system is provided for steering at least one of two or more optical input beams from one or more sources and combining the two or more optical input beams into an optical output beam. The system has a waveguide comprising an inlet and an outlet at opposite ends of the waveguide. The waveguide is configured to combine the two or more optical input beams from the one or more sources and to form a combined optical output beam at the outlet of the waveguide. The system further comprises one or more phase controlling devices At least one of the one or more phase controlling devices is configured to control a phase of at least one of the two or more optical input beams. The waveguide in conjunction with the one or more phase controlling devices is configured to form the combined optical output beam that is coherent. The system is also comprised of one or more beam steering devices. At least one of the one or more beam steering devices is configured to laterally steer, angularly steer, or laterally and angularly steer at least one of the two or more optical input beams. The waveguide, in conjunction with the one or more beam steering devices, is configured to form the combined optical output beam that is angularly steered, laterally steered, or angularly and laterally steered.

An aspect of the present invention relates to a method of steering at least one of two or more optical input beams and coherently combining the two or more optical input beams into an optical output beam. The method comprises receiving two or more optical input beams, each having a phase, and adjusting the phase of at least one of the two or more optical input beams using one or more phase controlling devices. The method further comprises steering at least one of the two or more optical input beams laterally, angularly, or laterally and angularly. The method further comprises combining the two or more optical input beams using a waveguide, and producing at an outlet of the waveguide a combined optical output beam that is coherent and is angularly steered, laterally steered, or angularly and laterally steered.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIGS. 5(a)-5(f) illustrate beam steering and corresponding optical output beam intensity profiles in accordance with one aspect of the present invention.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as not to obscure the present invention.

According to one aspect of the present invention, for optical beam applications, and particularly with high power optical beam applications, the interior of a waveguide is hollow and either evacuated or filled with material (for example, a gas or other suitable material or substance) that does not break down or produce non-linear optical effects in the presence of high optical field strengths. In hollow waveguides, the waveguide walls may be formed, for example, from metal or metal alloys with highly polish interior surfaces. In another aspect, a waveguide may include, for example, glass or crystal structures having highly reflective coatings deposited on the interior surfaces. In yet another aspect, a waveguide may comprise non-hollow glass or crystal structures having highly reflective coatings on their exterior surface. In yet another aspect, a waveguide may comprise a core material enclosed with an exterior cladding material, wherein the core material and the cladding material have different indices of refraction to promote total internal reflection, or any other suitable structures.

Figure 4A:
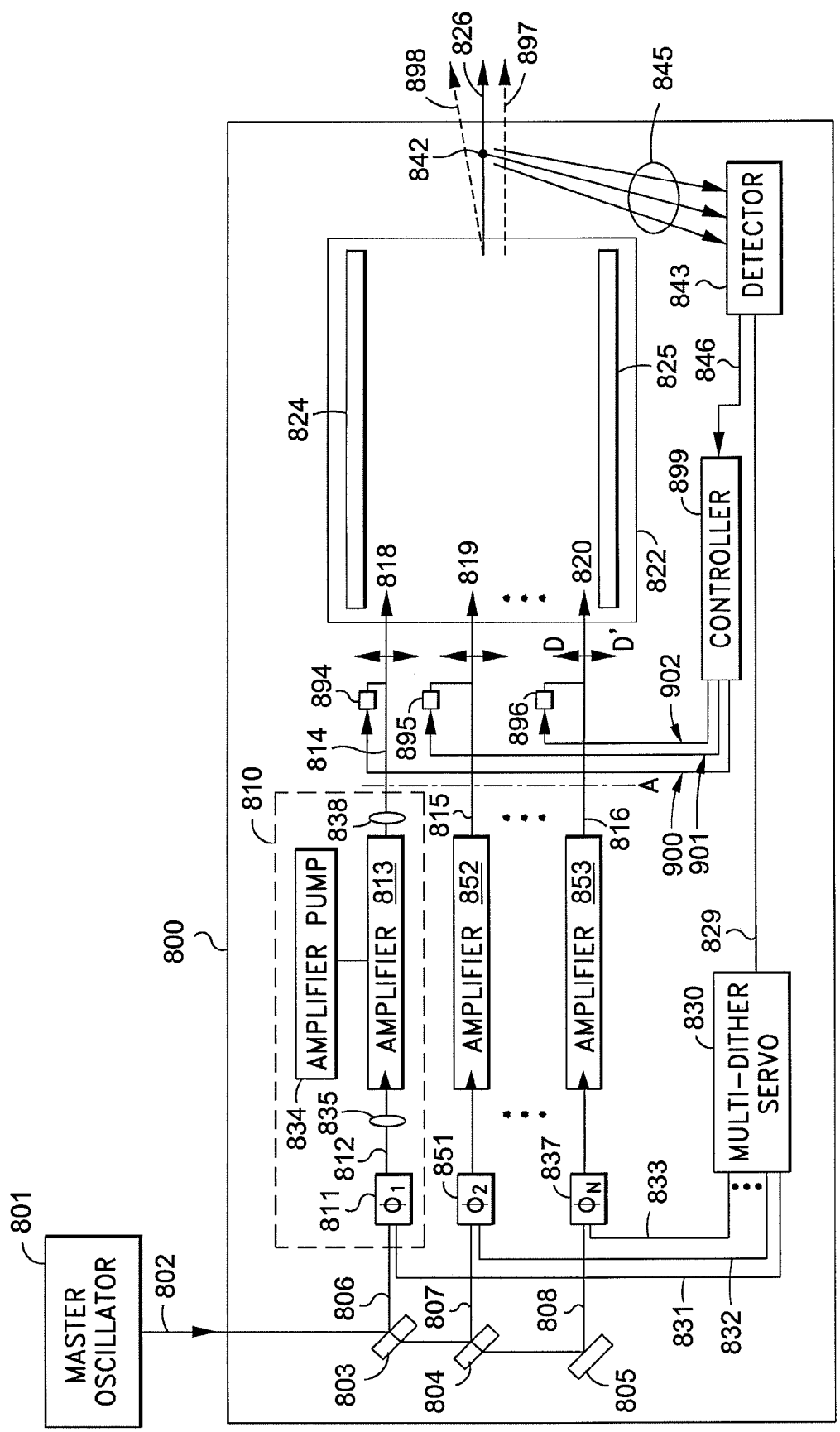
FIGS. 4(a)-4(c) illustrate optical systems for beam steering and combination in accordance with various embodiments of the present invention.

Various embodiments of the present invention are based on the self-imaging properties of appropriately designed waveguides (e.g., waveguide 822 illustrated in FIG. 4(a)). Self-imaging in waveguides refers to the concept that if the length of the waveguide equals the self-imaging waveguide (SWIG) length (also referred to as the "Talbot length") $L_s=4nh^2/\lambda$, then an optical input beam reproduces itself and forms itself as a beam at the output plane of the waveguide. Here, the refractive index of the waveguide is n, and $\lambda$ is the wavelength. In the case of a vacuum or a gas filling the interior of the waveguide, n is about 1.0, so that the SIWG length reduces to $L_s=4h^2/\lambda$. If the length of L is reduced to $L=L_s/2$, then two spatially separated replica optical output beams may be formed from an optical input beam into the waveguide. Since waveguide propagation is reciprocal, it is also the case that a plurality of optical input beams to a waveguide may produce a single optical output beam from the waveguide, provided that the phases of the plurality of the beams are substantially the same. Alternatively, the phases between the beams may be different, wherein the phase of each beam has a particular offset that is substantially maintained. In various exemplary embodiments of the present invention, a waveguide may be used to combine a plurality of optical input beams into a single optical output beam. In addition to the true images formed at multiples of the Talbot length, fractional Talbot images (also known as "Fresnel images") are also formed at fractional Talbot lengths, for example, at distances $L_s/2$, $L_s/3$, ... $L_s/N$. A plurality of images may be formed across the height of the waveguide.

Generally, inputting a plurality of optical beams (e.g., laser beams) into a waveguide is insufficient for the beams to coherently combine as one beam. In addition to inputting beams at proper position and proper pointing angles having substantially the same intensity profile, it may also be desirable that the beams have the same polarization and are locked together in a phase relationship. The phase relationship may be for example, substantially identical phases between the beams. Alternatively, the phase relationship may be that the beams have different phases, and the phase offset between the beams is substantially maintained by phase-locking. One of skill in the art may utilize various apparatus and methods to ensure that the multiple beams have the same polarization state. As the number of beams to be combined increases, the problem of phase locking the beams becomes more difficult. Dissimilar phases of the beams, or undesired phase offsets between the beams, may reduce the maximum attainable beam intensity when the beams are combined. The effectiveness of beam combination is increased when unintentional phase differences ("phase errors") between the beams are minimized or reduced. If this is not effectively achieved, the addition of N beams with random phases may produce a combined beam having an intensity proportional to $NI_0$, where N is the number of beams and $I_0=|E_0|^2$ is the intensity of a single beam. Coherent beam combination refers to beam combination where phase errors are minimized, in which the total combined intensity scales with the number of beams as $|NE_0|^2=N^2I_0$. For a small number of beams, the difference may not be a significant concern. However, for an increasing number of beams N, the difference has significant implications on efficiency of the system in delivering maximum intensity at a target.

Figure 1:
FIG. 1 illustrates self-imaging in a waveguide with a filled aperture according to one aspect of the present invention.
Figure 2:
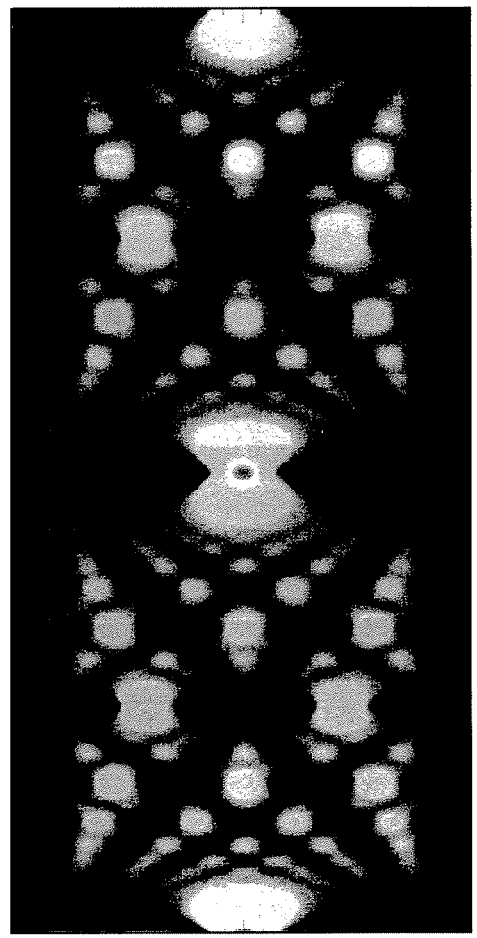
FIG. 2 illustrates self-imaging in a waveguide with an underfilled aperture according to one aspect of the present invention.

The beam combiner is based on self-imaging waveguides. Turning to FIGS. 1-2, FIG. 1 illustrates self-imaging in a one dimensional waveguide with a filled aperture, and FIG. 2 illustrates self-imaging in a waveguide with an underfilled aperture according to one aspect of the present invention. Self-imaging waveguides are typically used with filled apertures for applications such as amplifiers and beam transport. When the aperture is underfilled, as illustrated in FIG. 2, the beam breaks up into multiple copies of itself at intermediate planes before the optical input beam is reconstructed. Appropriate selection of waveguide length allows multiple copies of a beam to be launched with the correct relative phases, thus forming a single beam at the output of the waveguide. For the case shown, two beams may be launched into a waveguide with ¼ the length shown to produce a single optical output beam.

The beam steering systems and methods of the exemplary embodiments of the present invention extend the features of re-imaging assisted phased arrays ("REAPARs") to include beam steering capabilities. An advantage of REAPAR-based beam combination and steering systems and methods is that they overcome the limitations and vulnerability of current spectral, temporal, or coherent beam-combining techniques. Loss and damage risk are minimized by eliminating substantially all refractive or diffractive optics from a beam train after the final amplifier in each optical subsystem. Accordingly, this produces power scaling from single aperture powers of about 1 kW to hundreds of kW without lenses, gratings, or holographic components. Additionally, beam sidelobes are substantially reduced or eliminated.

REAPARs with beam steering, as described herein, are compatible with many laser architectures, including slab-, fiber-, and waveguide-based systems. In various embodiments of the present invention, REAPARs are used to provide an increase in brightness compared to the equivalent output from a conventional phased array laser system without beam combination or beam steering. The increase in brightness is manifested through a substantial reduction of the power in sidelobes and increased system throughput. This minimizes collateral damage and system thermal loads, significantly decreasing system power requirements, and increases power-on-target.

Figure 3B:
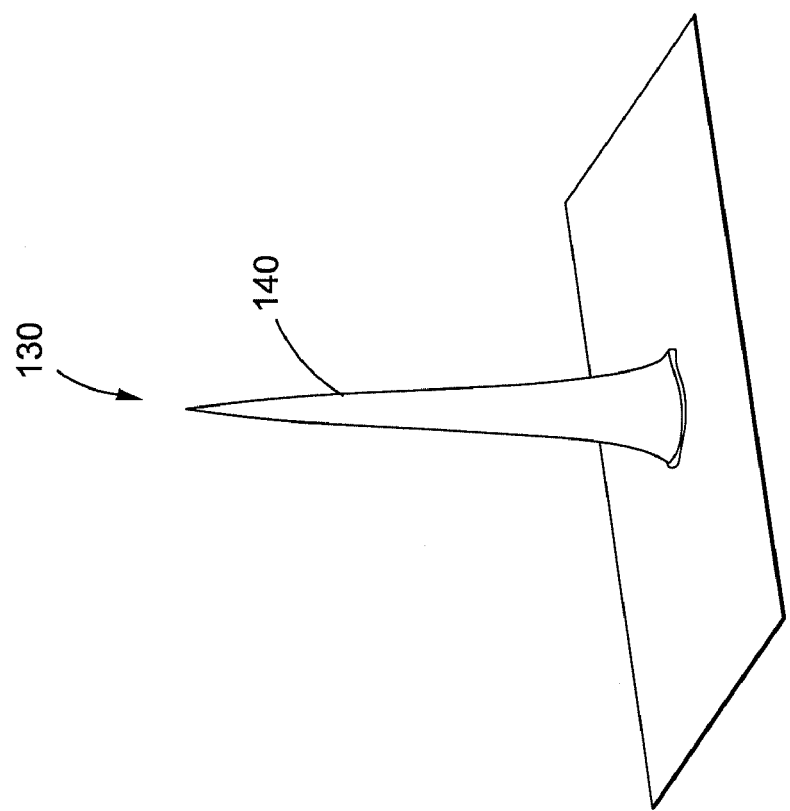
FIG. 3(b) illustrates a waveguide phased array far-field intensity beam output profile that is free of sidelobes according to one aspect of the present invention.
Figure 3A:
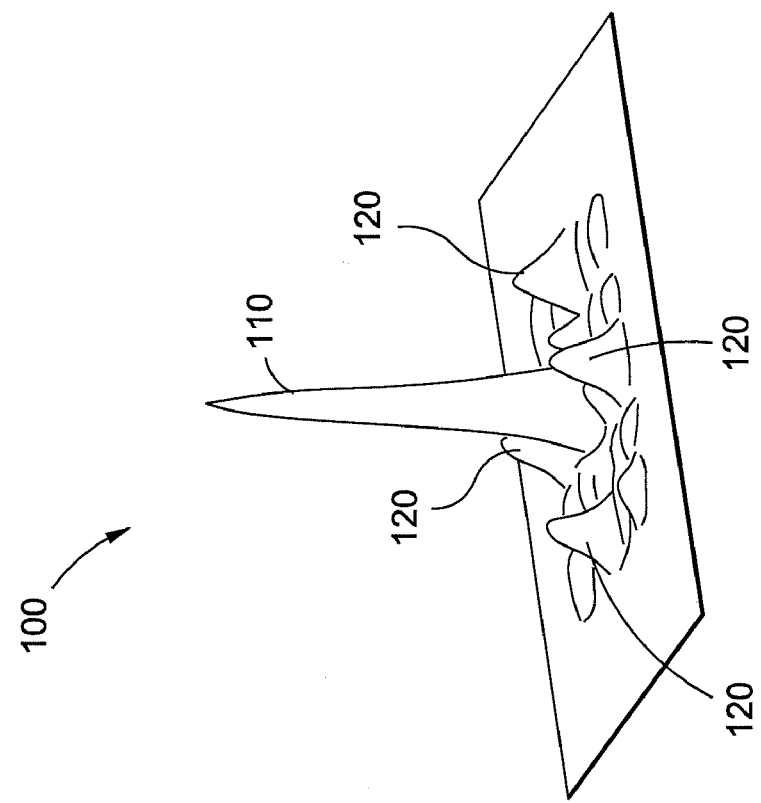
FIG. 3(a) illustrates a conventional phased array far field intensity optical output beam profile.

FIG. 3(a) illustrates far-field intensity pattern 100 from a 3×3 array without REAPAR. As shown, beam 110 of far field intensity pattern 100 has sidelobes 120, which are undesirable. FIG. 3(b) illustrates far-field intensity pattern 130 from a 3×3 array with REAPAR according to one aspect of the present invention. As shown, beam 140 of far field intensity pattern 130 has a substantial reduction of sidelobes. Decreasing the sidelobes has the advantage of increasing the brightness of beam 140, and also provides greater system throughput. The 3×3 array in FIGS. 3(a) and 3(b) has nine Gaussian beams in a rectangular pattern with a 3ω center-to-center spacing, where ω is the beam waist. Closer packing of the beams can provide an increase in Strehl, but the difficulty of implementing this is increased. A Strehl ratio is the ratio of the observed peak intensity at the detection plane of an imaging system from a point source (in this case, a laser beam) compared to the theoretical maximum peak intensity of an imaging system working at the diffraction limit. A Strehl of about 0.5 is obtained without REAPAR, compared with a Strehl of greater than or equal to about 6.85 with the REAPAR.

Turning to FIG. 4(a), an optical beam steering and combining system 800 is illustrated. Master oscillator laser 801 is used to provide a stable phase reference laser beam 802. Laser beam 802 is coupled into optical beam steering and combining system 800, where a series of partially reflecting mirrors 803-804 and fully reflecting mirror 805 split the power of beam 802 into generally N beams 806-808 of lower power. Generally, mirrors 803-805 are selected such that beams 806-808 have approximately the same power. Each of the split beams (i.e., beams 806-808) is next coupled into an amplifier subsystem. For example, beam 806 is coupled into amplifier subsystem 810. Amplifier subsystem 810 comprises a number of parts, such as phase adjuster 811 and optical amplifier 813. The subsystem 810 also contains a pump source 834 for the amplifier 813, and it may also incorporate lenses or other optics 835 and 836 to efficiently couple light into and out of the amplifier 813. Beam 806 is coupled through phase adjuster 811 as beam 812, through optic 835, and into amplifier 813. The amplifier 813 increases the power of the optical beam 812 and outputs an amplified beam 814 after transmission through optic 836.

Exemplary amplifier subsystem 810 is illustrated above, and similar subsystems exist for other beams 807 and 808. One such subsystem may include phase adjuster 851 and amplifier 852 for beam 807, and another such subsystem may include phase adjuster 837 and amplifier 853 for beam 808. These subsystems may also have amplifier pumps and additional optics configured in a manner similar to those of amplifier subsystem 810. Thus, each of beams 807 and 808 produces amplified beams 815 and 816, respectively, using its corresponding subsystem. N amplified beams (e.g., beams 814-816) can be produced that propagate through their respective beam steering devices (e.g., beam steering devices 894-896). Each of the beam steering devices 894-896 may be, for example, a piezoelectric device, an electro-optic modulator, an acousto-optic modulator, or any other suitable device.

According to one aspect of the present invention, laterally steering an optical input beam relative to its input beam axis may form an angularly steered optical output beam at the outlet of a beam combiner (i.e., at an angle relative to the longitudinal axis of the beam combiner). In another aspect of the present invention, the beam combiner may be selected such that laterally steering an optical input beam relative to its input beam axis may form a laterally steered optical output beam at the outlet of a beam combiner. As used throughout, lateral steering may be steering in a vertical direction, a horizontal direction, or a combination thereof. Angularly steering an optical input beam at an angle relative to its input beam axis may form a laterally steered optical output beam (e.g., laterally steered relative to the longitudinal axis of the outlet of the beam combiner). In another aspect, angularly steering an optical input beam at an angle relative to its input beam axis may, with the use of a selected beam combiner, form an angularly steered optical output beam (e.g., at an angle relative to the longitudinal axis of the beam combiner). In addition, an optical input beam may be steered by any combination of lateral and angular steering to form an optical output beam that is a combination of lateral and angular steering. Alternatively, the length of a beam combiner (e.g., the length of a waveguide) may be configured so as to produce a laterally steered optical output beam.

Figure 4C:
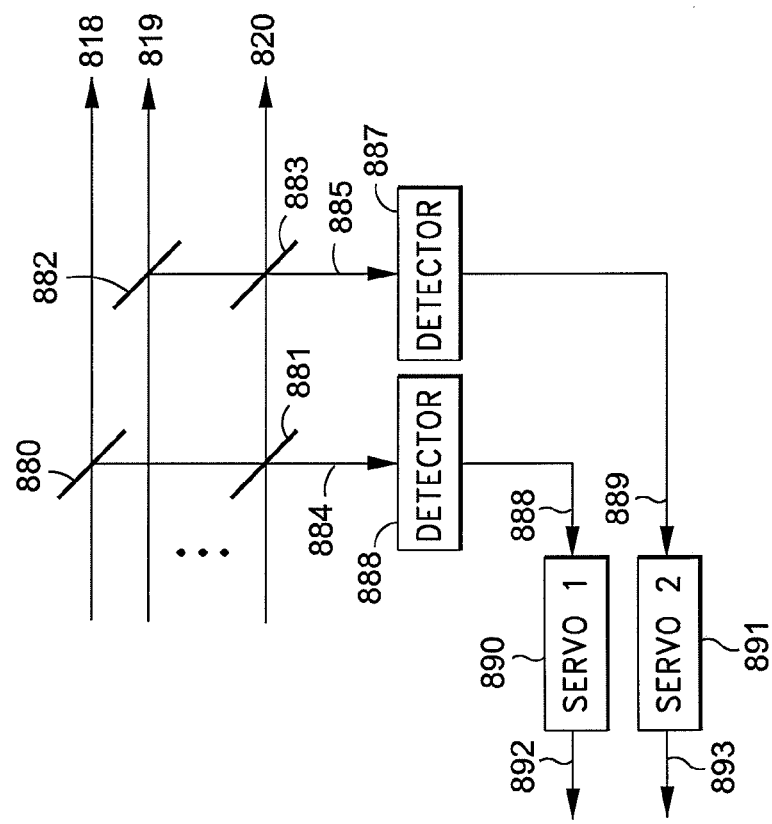

Each of beam steering devices 894-896 may be independently adjusted by a control circuit (e.g., controller 899) so as to move an optical input beam in a vertical direction, in a horizontal direction, or any combination thereof, as desired. Controller 899 is communicatively coupled to the beam steering devices (e.g., controller 899 outputs control signals 900-902 to beam steering devices 894-896), as well as to detector 843. As described herein, controller 899 may send control signals 900-902 to control the lateral or angular steering (or both) of the optical input beams by beam steering devices 894-896 using signals 846 received from detector 843. For example, as illustrated in FIG. 4(d), controller 899 may control beam steering device 894 to steer beam 814 in a vertical direction, such as the z-direction by a magnitude of Δz, to form steered optical input beam 818. In another example, as illustrated in FIG. 4(e), controller 899 may control beam steering device 894 to steer beam 814 in a horizontal direction, such as the x-direction by a magnitude of Δx, to form steered optical input beam 818. Alternatively, the controller 899 may control the angular steering of the optical input beam. For example, as illustrated in FIG. 4(f), optical input beam 814 may be angularly steered by angle θ to form steered optical input beam 818.

A beam combiner, such as waveguide 822, may combine the steered optical input beams to form a combined optical output beam that is steered. For example, a steered optical input beam that is steered in the z-direction as shown in FIG. 4(d) may be used to form a combined optical output beam 898 that is angularly steered by angle Φ relative to the longitudinal axis (e.g., y' axis) of the outlet of the beam combiner (e.g., waveguide 822) as shown in FIG. 4(g). In another example, a steered optical input beam that is steered in the x-direction as illustrated in FIG. 4(e) may be used to form a combined optical output beam 898 that is angularly steered by angle Φ relative to the longitudinal axis of the outlet of the beam combiner (e.g., waveguide 822) as shown in FIG. 4(h). In yet another example, a steered optical input beam that is angularly steered by angle θ as shown in FIG. 4(f) may be used to form a combined optical output beam 897 that is laterally steered in the z'-direction by a magnitude of Δz' as illustrated in FIG. 4(i).

Figure 4B:
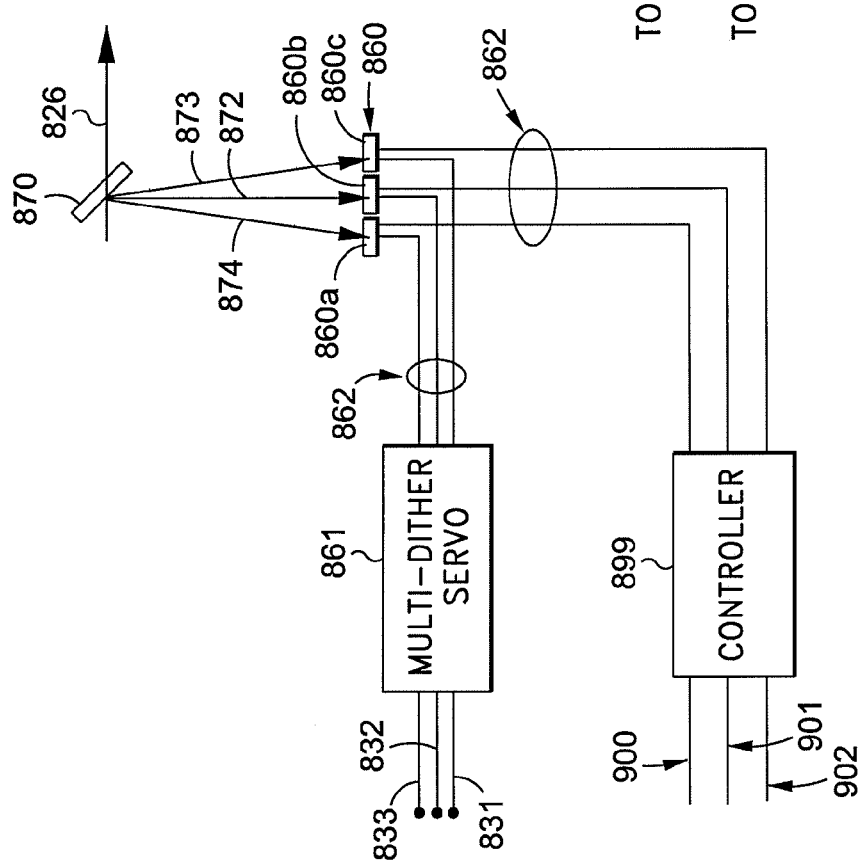
Figure 4D:
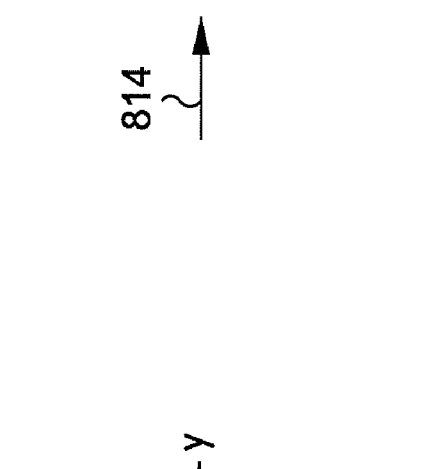
FIGS. 4(d)-4(f) illustrate lateral or angular optical input beam steering by the beam steering devices in accordance with one aspect of the invention.
Figure 4E:
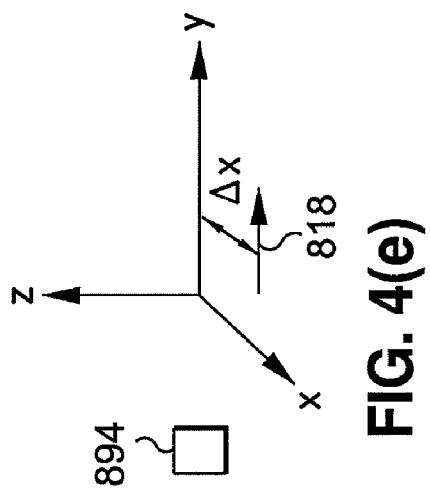
Figure 4F:
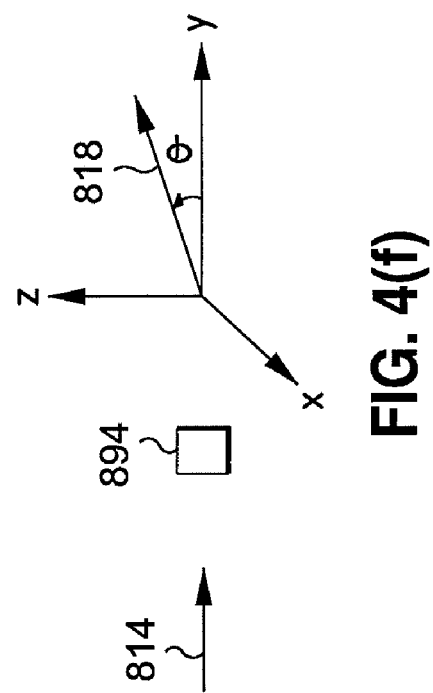
Figure 4H:
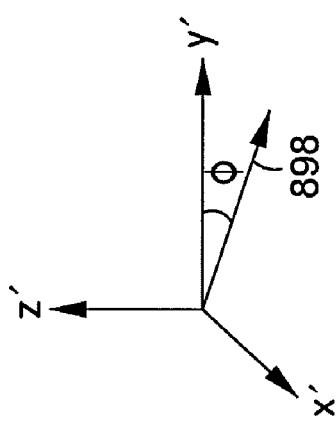
FIGS. 4(g)-4(i) illustrate laterally or angularly steered optical output beams at the outlet of a waveguide in accordance with one aspect of the invention.
Figure 4I:
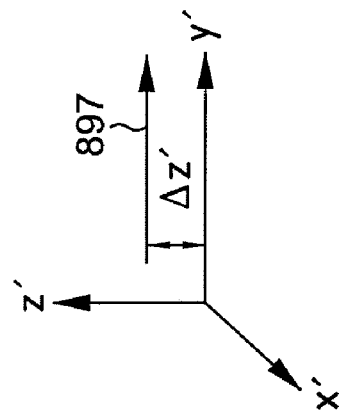
Figure 4G:
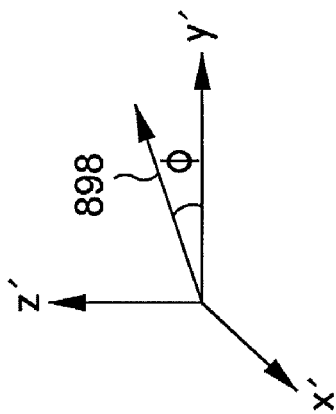

In an alternate embodiment, the control circuit (e.g., controller 899) may be integrated with multi-dither servo 830 (instead of having a separate controller such as controller 899), which may be communicatively coupled to beam steering devices 894-896, and may control these devices based on signals received from detector 843 (or detectors 860a-860c shown in FIG. 4(b)).

The steered beams emerge from beam steering devices 894-896 as steered optical input beams 818-820, which are coupled into waveguide 822 comprising reflective surfaces 824 and 825. Although reflective surfaces 824 and 825 are shown, there may be two or more reflective surfaces in the waveguide. Waveguide 822 is designed and arranged such that a single coherently combined beam such as beam 826 emerges at the outlet when the phases and offsets between the optical input beams have the proper relationship. Optical output beam 826 is formed from steered optical input beams 818-820 having substantially no lateral or angular steering. As discussed above, depending on whether optical input beams 818-820 have been laterally and/or angularly steered by beam steering devices 894-896, the single coherent optical output beam may be (a) angularly steered, such as optical output beam 898, (b) laterally steered, such as optical output beam 897, or (c) angularly and laterally steered (not shown).

According to one aspect of the present invention, one or more optical input beams can be laterally steered, angularly steered, or laterally and angularly steered to produce a combined optical output beam that is angularly steered, laterally steered, or angularly and laterally steered. For example, one of the optical input beams 814-816 can be laterally steered, another one of the optical input beams can be angularly steered, and yet another one of the optical input beams can be angularly and laterally steered. In another example, only one of the optical input beams is laterally steered, angularly steered, or laterally and angularly steered. In yet another example, two or more of the optical input beams is laterally steered, angularly steered, or laterally and angularly steered.

The phase measurements and the phase adjustments ensure that the relative phases of steered optical input beams 818-820 are such that coherent beam combination takes place resulting in a substantial single-lobed beam (similar to beam 140 illustrated in FIG. 3(b)) emerging at the outlet of the waveguide 822. In a preferred embodiment, this is achieved by monitoring an aspect of the optical output beam intensity profile and adjusting the phases or the linear shifting of the optical input beams to produce a beam profile that meets a predetermined criterion. Such a criterion may include one or more of the following: minimizing optical output beam $M^2$, minimizing sidelobe intensity, minimizing transverse intensity variations, maximizing on-axis beam intensity, or maximizing beam Strehl ratio.

Monitoring the optical output beam intensity profile may be accomplished in a number of different ways, including monitoring light scatter from downstream optics or through the insertion of a beam sampler into the optical output beam. Depending on the power of the optical output beam, this beam sampler may, in substantially moderate beam power situations, include an optical element, such as a partly reflecting optical surface. If the beam is of substantially high power, the beam sampler may also advantageously include a substantially fine wire of high thermal conductivity material, such as tungsten. When a beam sampler is inserted into the beam, it is preferably done at a predefined distance away from the output end of the waveguide (e.g., where beam 826 is output from waveguide 822) so that the beam footprint at the beam sampler is greater than the beam footprint at the output of waveguide 822. As a result, the intensity incident on the sampler, such as the wire, is below damage limits. For example, it may be desirable to place a wire with a diameter on the order of about 25 μm into the beam at a point where the beam width is 25 cm. In such a case, the fraction of the power incident on the wire is approximately 0.01%. If the laser is operating at an output power of about 100 kilowatts (kW), the power incident on the wire is about 10 watts (W). Since the wire would be designed to scatter (rather than absorb) incident power, the amount of power absorbed in the wire can be made relatively small, such as less than about 1 W.

Wire 842 may be present in beam 826. Wire 842 generally scatters light 845 over a wide range of angles, and detector 843 is set up to detect some of the scattered light. In this example, it is assumed that wire 842 is placed in about the middle of the optical output beam 826 (or, alternatively, in about the middle of beam 897 or beam 898) so that the detected light is proportional to the beam intensity at the center. In this case, the beam combination criterion is maximizing the on-axis intensity, and the purpose of multi-dither servo 830 is to alter the phases of beams 806-808 such that the mean signal on line 829 is maximized. However, if optical output beam steering such as angular steering, lateral steering, or a combination thereof, is desired, it may be preferable to maximize an intensity that is different from the on-axis intensity depending on the amount of desired angular or lateral optical output beam steering.

In the case of multiple (N) beams, an equal number of N phases is adjusted, and may also be laterally adjusted. Generally, one phase is left to "float" as a reference and the other N−1 phases are adjusted relative to this reference. A number of methods can be used to perform this co-phasing operation. It is possible to adjust each phase and determine whether phase alterations increase or decrease the detected intensity. A disadvantage of this method is that it is generally slow. In addition, if the detected intensity begins to decrease, one cannot typically tell which beam is causing the problem until the beams are individually tested.

A preferred method is to use a multi-dither servo in which encoding of signals is used to separate individual phase error contributions. To implement this method, the phase of one beam may be left to float as a reference, while the others are adjusted to the reference phase value. For example, the phases of the other beams may be adjusted to be the same as the reference beam, or may be adjusted to have particular offsets relative to the reference beam. In order to separate the channels, each control signal 831-833 from servo 830 (illustrated in both FIGS. 6(a) and 6(b)) is composed of two parts. One is a DC control signal that varies the mean phase. The second part is a small, substantially fast dither at a specific frequency unique to each beam. The amount of dither is generally small, such that the magnitude of the dithered phase is less than $2\pi$. By dithering the phase of individual beams at frequencies unique to each beam the optical signal 845 and the electrical signal 829 contain amplitude variations at the multiple dither frequencies. Since the frequencies for all channels are unique, the contributions can be separated electronically in servo 830, and the amplitude at each can be frequency determined. By altering the DC part of the control signal, the amplitude modulation for each beam can be driven to a predetermined state corresponding to maximum on-axis beam intensity. This process is carried out in parallel on all channels resulting in phase-locking of all beams at the input to waveguide 822. Although the phase-locked beams may have the same phase, the beams may also be phased-locked to different phases with particular offsets, or any suitable combination thereof.

Several methods can be used to perform the locking, including those that dither individual phases sequentially and others that dither all phases simultaneously. An example of the former would be a system where the phases are first adjusted in pairs followed by co-phasing of all pairs. Preferably, substantially simultaneous dithering of all phases is performed to decrease or eliminate problems typically involving multi-parameter optimization.

Exemplary phase shifters 811, 851 and 837, may be any suitable type of device that can produce an optical phase shift in response to an electrical signal. Suitable devices include, but are not limited to, liquid crystal phase modulators, electro-optic phase modulators, acousto-optic phase modulators, piezoelectric devices, or any combination thereof, or any other suitable device. Master oscillator 801 and amplifiers 813, 852, and 853 may be any suitable devices at any radiation wavelength. Master oscillator 801 may be a rod laser, a fiber laser, a gas laser, an excimer laser, a waveguide laser, or any other laser with suitable characteristics operating with a single frequency at a power level, for example, in the range of 0.1-100 W. Amplifiers 813, 852, and 853 may be fiber amplifiers, waveguide amplifiers, or conventional bulk amplifiers and may be designed to optical output beams at a power level of $P_a$=1-10 kW. If there are N beams in optical beam steering and combining system 800, the output power in beam 826 is N $P_a$.

Detector 843 may be a single detector or an array of detectors, and may be used to monitor the on-axis intensity of the optical output beam (e.g., beam 826) or, alternatively, the intensity of optical output beam in a location on the detector or detector array that is not on-axis. For example, if it is desirable to have an angularly or laterally steered optical output beam (e.g., such as beam 898 or 897) or a combination thereof, the maximum intensity of such optical output beam may not be the same as the intensity of an optical output beam having the on-axis intensity. Detector 843 may be configured to detect optical output beam intensity for an optical output beam with less than or equal to one degree of angular or lateral steering. Detected signals proportional to the amount of power in the central lobe of the optical output beam, and the location of the central lobe relative to the on-axis center of the detector or detector array, may then be transmitted as signals 846 to controller 899. Controller 899 may monitor output signals 846 and appropriately control beam steering devices 894-896 that are communicatively coupled to controller 899 using control signals to achieve the desired angular or lateral steering (or a combination thereof) for the optical output beam.

The general architecture illustrated in FIG. 4(a) and described above can be used in situations where the beam quality metric is different than on-axis intensity. An alternative method is illustrated in FIG. 4(b). As shown, sampling optic 870, which may be a flat piece of glass or other suitable object, is used to pick off a portion of the power in optical output beam 826 (or, alternatively, optical output beams 897 or 898). The sample is directed to a set of detectors 860 (i.e., detectors 860a-860c). The size and spacing of detectors 860 is selected such that the central detector primarily receives power in the part of the beam corresponding to the central desired lobe 872. Two outer detectors, 860a and 860c, "look at" the sidelobes represented by lines 873 and 874. Detected signals proportional to the amount of power in the central lobe and sidelobes may then be transmitted as signals 862 to the multi-dither servo 861. Multi-dither servo 861 outputs control signals 831-833 to the phase shifters (e.g., phase shifters 811, 851, and 837 in FIG. 4(a)) in the channels. Similarly, detected signals proportional to the amount of power in the central lobe and sidelobes may also be transmitted as signals 862 to controller 899, and controller 899 may output control signals 900-902 to beam steering devices 894-896 (see FIG. 4(a)) to make adjustments with optical input beam steering. Thus, the control outputs are similar to the wire scattering method discussed above. Information about the optical output beam intensity profile may be obtained, which may be useful to phase lock the beams, make adjustments to steering the optical output beam, and evaluate the beam quality for diagnostics.

The phase locking method described above may be referred to as operating in the far field after the combination is performed. It is also possible to combine the near field prior to combination, for example, at a plane indicated by line A in FIG. 4(a). FIG. 4(c) illustrates beam 820 entering waveguide 822, and is designated as the reference beam. For each of the other steered optical input beams 818-819, beam samplers 880 and 882 (e.g., weakly reflecting mirrors or other suitable optical components) are used to divert samples of the steered optical input beams 818 and 819. Beam samplers 881 and 883 are used to pick off samples of steered optical input beam 820 in such a manner that beam 884 comprises the coherent addition of a sample of steered optical input beam 818 picked off with sampler 880 and a sample of steered optical input beam 820 picked off with beam sampler 881. Similarly, beam 885 comprises the coherent addition of a sample of steered optical input beam 819 picked off with sampler 882 and a sample of steered optical input beam 820 picked off with beam sampler 883. Beams 884 and 885 can now be separately detected using detectors 886 and 887 and the detected electrical signals 888 and 889 can be sent to two separate servos 890 and 891 that independently output control signals 892 and 893 to the phase control elements (e.g., phase shifters 811, 851, and 837 of FIG. 4(a)). An advantage of this approach is that by separately mixing each beam with the reference beam, it is not necessary to use multi-dither techniques to know the relative phase between any one beam and the reference.

The beam combination system described in FIGS. 4(a)-(c) is useful with both continuous wave (CW) and pulsed lasers. With CW lasers, it is possible to maintain continuous phase lock because the beams are always present. When a pulsed laser is used, and if phase lock is established at one time, at the time of the next pulse the relative phases may have drifted, thereby not producing the appropriate phase control. In such circumstances, it is possible to inject a separate laser beam into the system that traverses the same path as the main beam. The function of this separate laser beam is to keep the system co-phased until the main beam is fired.

According to one aspect of the present invention, optical input beams may be configured to have lateral steering, angular steering, or any combination thereof so as to form a combined optical output beam that is angularly and/or laterally steered, while maintaining near diffraction limited beam quality.

FIGS. 5(a)-5(f) provide exemplary illustrations of laterally steering optical input beams and combining the steered optical input beams to form an steered optical output beam using a 3-1 beam combiner (e.g., a waveguide).

In FIG. 5(a), the 3-1 beam combiner forms a single, on-axis beam at the output. As shown, waveguide 1000 has reflective surface elements 1001 and 1002, and is configured to receive beams 1004, 1006, and 1008. Although reflective surface elements 1001 and 1002 are shown, there may be two or more reflective elements in a waveguide (e.g., waveguide 1000). The steered optical input beams illustrated in exemplary FIG. 5(a) may be steered by beam steering devices (e.g., beam steering devices 894-896 of FIG. 4(a)) so as to change the spacing between the optical input beams (e.g., beams 1004, 1006, and 1008) entering the inlet of the waveguide. Optical input beam 1004 is spaced from optical input beam 1006 by distance 1005, and optical input beam 1006 is spaced from optical input beam 1008 by distance 1007. In FIG. 5(a), distances 1005 and 1007 are approximately equal. Accordingly, waveguide 1000 combines optical input beams 1004, 1006, and 1008 to form optical output beam 1010, which is a singular, on-axis beam (i.e., relative to the longitudinal axis of waveguide 1000). FIG. 5(b) illustrates beam profile 1012 of optical output beam 1010 of FIG. 5(a). As shown, beam profile 1012 is Gaussian and has width 1014.

Compared to FIG. 5(a), optical input beam 1004 of FIG. 5(c) has been laterally steered in the D direction (i.e., vertically steered) by a beam steering device, creating distance 1016 between optical input beams 1004 and 1006. Distance 1016 is greater than distance 1005 in FIG. 5(a). Optical input beam 1008 has been laterally steered in the vertical direction (i.e., the D direction), towards optical input beam 1006. Distance 1018 is thus shorter than distance 1007 in FIG. 5(a). In FIG. 5(c), laterally steered optical input beams 1004 and 1008 have been moved in the D direction, respectively, by beam steering devices (e.g., beam steering devices 894 and 896 of FIG. 4(a)). From steered optical input beams 1004, 1006, and 1008 in FIG. 5(c), optical output beam 1020 is formed by waveguide 1000, wherein the optical output beam 1020 is angularly steered compared to optical output beam 1010 of FIG. 5(a). Optical output beam 1020 is a single beam that is angularly steered by angle $\Phi_1$ relative to the longitudinal axis of waveguide 1000. Optical output beam 1020 also has a Gaussian beam profile 1022, as illustrated in FIG. 5(d), which is similar to beam profile 1012 of FIG. 5(b). Width 1024 of beam profile 1022 is greater than width 1014 of beam profile 1012. There is nearly a linear relationship between the lateral steering of the optical input beams (e.g., movement of optical input beams in the D or D' direction) and the angular steering of optical output beam 1020 by angle $\Phi_1$. In exemplary FIG. 5(c), angle $\Phi_1$ for optical output beam 1020 is less than or equal to one degree of optical output beam angular steering.

In FIG. 5(e), optical input beam 1004 has been laterally steered in the D direction, optical input beam 1006 has been laterally steered in the D' direction, and optical input beam 1008 has been laterally steered in the D direction, relative to the steered position of optical input beams 1004, 1006, and 1008 in FIG. 5(a). These optical input beams are steered by beam steering devices (e.g., beam steering devices 895, 896, and 897 illustrated in FIG. 4(a)). Optical input beams 1004, 1006, and 1008 are combined in waveguide 1000 to form optical output beam 1028, which has substantial angular steering by angle $\Phi_2$ in contrast to optical output beam 1010 in FIG. 5(a), which exhibits no angular steering, and in contrast to optical output beam 1010 in FIG. 5(c), which has less than or equal to one degree of angular steering. Turning to FIG. 5(f), optical output beam 1028 has non-Gaussian beam profile 1030, with peaks 1032 and 1034, with beam profile width 1036. As indicated by beam profile 1030, the lateral steering of optical input beams 1004, 1006 and 1008 thus produce an undesirable beam output, although optical output beam 1028 has substantial angular steering, which may be desirable. In contrast to the arrangement in FIG. 5(c), the steering of the optical input beams in FIG. 5(e) forms an optical output beam with angle $\Phi_2$ that is greater than one degree, and, as shown in FIG. 5(f), the optical output beam quality begins to degrade as illustrated by beam profile 1030.

Figure 6:
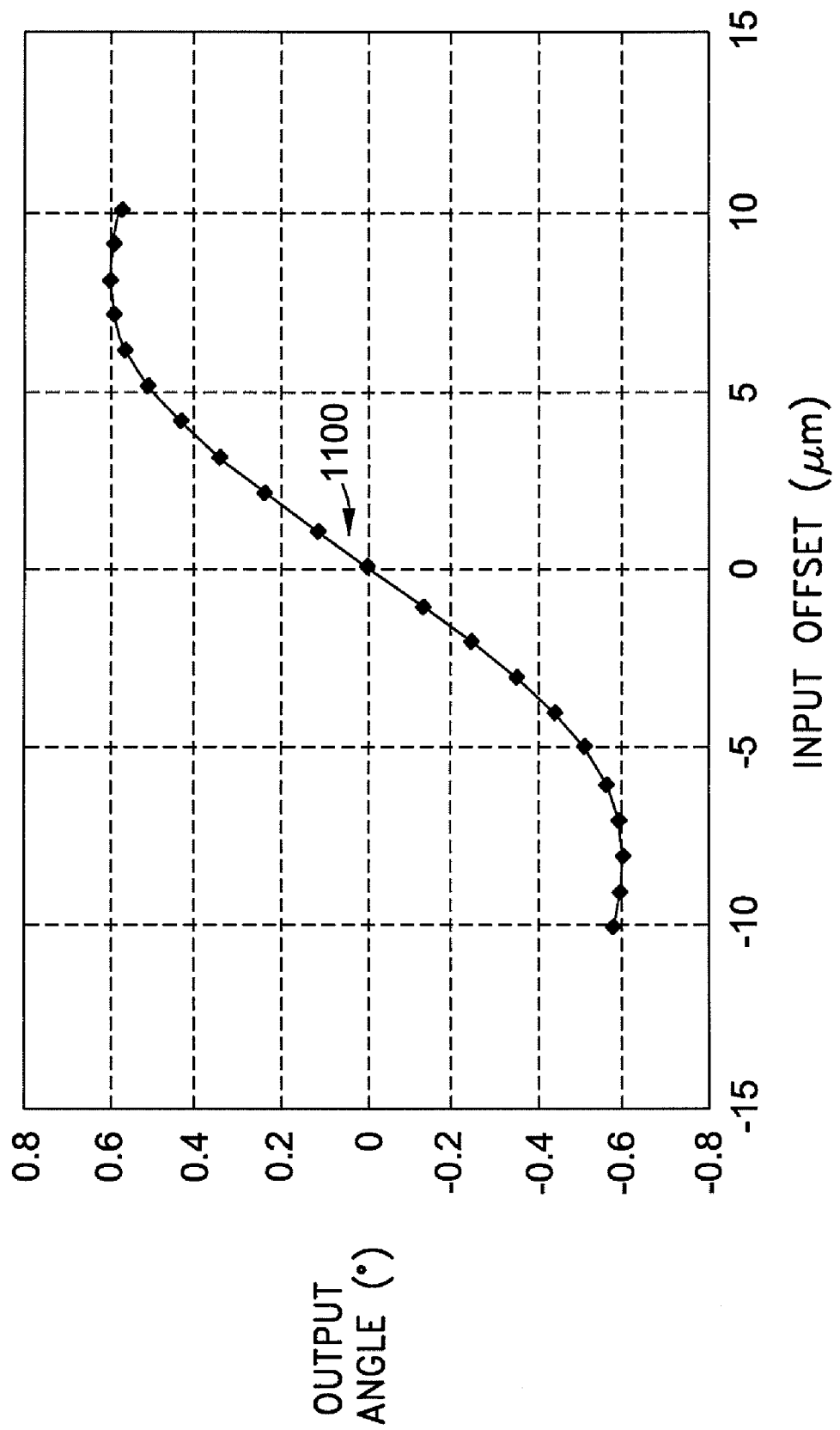
FIG. 6 is a graph depicting angular steering of an optical output beam as it relates to lateral steering of an optical input beam according to one aspect of the present invention.

FIG. 6 illustrates graph depicting angular steering of an optical output beam (expressed as output angle in degrees) as it relates to lateral steering of an optical input beam (expressed as input offset in μm) according to one aspect of the present invention. As shown by curve 1100, as an optical input beam is laterally steered (e.g., optical input beam 1004, 1006 or 1008 of FIGS. 5(a), 5(c), and 5(e) or one of steered optical input beams 818-820 of FIG. 4(a)) is increased (either with a positive or negative input offset), the optical output beam angular steering increases (i.e., angle $\Phi$ increases). However, as indicated in FIGS. 5(e) and 5(f), the optical output beam profile may be adversely affected so as to become non-Gaussian if the amount of lateral steering of the optical input beam is substantially increased.

An advantage of the systems and methods of the present invention according to one aspect is that they provide integrated optical beam formation (e.g., formation of a laser beam) and beam-control systems that can be compact and lightweight, especially in comparison to laser systems coupled with traditional mechanical steering systems. In another aspect, the systems and methods of the present invention utilize beam steering devices, such as piezoelectric devices, electro-optic modulators, or acousto-optic modulators, or any combination thereof, to effectuate beam steering of optical beams and are able to perform angular beam steering at increased rates over traditional mechanical beam systems and methods. An advantage of the present invention for lateral or angular beam steering according to yet another aspect is that such systems and methods move substantially little mass to effectuate angular steering, thus making increased rapidity of beam steering possible over traditional mechanical systems and methods.

Furthermore, an advantage of the present systems and methods according to one aspect is that they achieve up to about one degree of angular beam steering while maintaining beam quality and minimizing beam degradation. In another aspect, an advantage of the lateral or angular beam steering is that it allows for beam jitter control and fine angle steering or fine-tracking for optical beam applications, particularly high power laser beam applications. The integration of laser and beam-steering system of the present invention enables optical beam system deployment on previously inaccessible classes of platforms such as tactical aircraft and unmanned aerial vehicles ("UAVs"). An advantage of the present invention according to yet another aspect is that it accomplishes beam steering at the same time as beam combination. A further advantage of the present invention according to yet another aspect is that it reduces the system parts count over previous mechanical systems.

The detailed description set forth above in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for steering at least one of two or more optical input beams from one or more sources and combining the two or more optical input beams into an optical output beam, the system comprising:
   a waveguide comprising an inlet and an outlet at opposite ends of the waveguide, the waveguide configured to combine the two or more optical input beams from the one or more sources and to form a combined optical output beam at the outlet of the waveguide;
   one or more phase controlling devices, at least one of the one or more phase controlling devices configured to control a phase of at least one of the two or more optical input beams, the waveguide in conjunction with the one or more phase controlling devices configured to form the combined optical output beam that is coherent; and
   one or more beam steering devices, at least one of the one or more beam steering devices configured to laterally steer, angularly steer, or laterally and angularly steer at least one of the two or more optical input beams, the waveguide in conjunction with the one or more beam steering devices configured to form the combined optical output beam that is angularly steered, laterally steered, or angularly and laterally steered.

2. The system of claim 1, further comprising an amplifier system having one or more amplifiers, at least one of the one or more amplifiers configured to amplify at least one of the two or more optical input beams, the amplifier system configured to output one or more amplified optical beams to the one or more beam steering devices.

3. The system of claim 1, further comprising a control circuit configured to control the one or more beam steering devices.

4. The system of claim 3, further comprising at least one detector coupled to the control circuit, wherein the at least one detector is configured to receive at least a portion of the combined optical output beam from the outlet of the waveguide and to provide a signal to the control circuit.

5. The system of claim 1, wherein the one or more beam steering devices are comprised of one or more piezoelectric devices, one or more electro-optic modulators, one or more acousto-optic modulators, or any combination thereof.

6. The system of claim 1, wherein the one or more beam steering devices are configured to form the combined optical output beam that is angularly steered in an amount less than or equal to about one degree.

7. The system of claim 1, wherein the at least one of the one or more beam steering devices is configured to laterally steer in a vertical direction, horizontal direction, or any combination thereof at least one of the two or more optical input beams so as to form the combined optical output beam that is laterally steered or angularly steered.

8. The system of claim 1, wherein the at least one of the one or more beam steering devices is configured to angularly steer at least one of the two or more optical input beams so as to form the combined optical output beam that is angularly steered or laterally steered in a vertical direction, horizontal direction, or any combination thereof.

9. The system of claim 1, wherein the at least one of the one or more beam steering devices is configured to laterally and angularly steer at least one of the two or more optical input beams so as to form the combined optical output beam that is angularly and laterally steered.

10. The system of claim 1, wherein each of the one or more beam steering devices is configured to steer its corresponding one of the two or more optical input beams.

11. The system of claim 1, wherein the one or more phase controlling devices comprise one or more phase adjusters, wherein the one or more phase adjusters are configured to substantially phase-lock the two or more optical input beams at the inlet of the waveguide.

12. The system of claim 11, wherein the one or more phase controlling devices comprise optics downstream of the outlet to the waveguide to provide one or more feedback beams and a control mechanism, the control mechanism configured to actively adjust the one or more phase adjusters based on the feedback beams and an optimization criterion to provide the substantially phase-locked optical input beams at the inlet of the waveguide.

13. The system of claim 1, wherein each of the one or more phase controlling devices is configured to adjust its corresponding one of the two or more optical input beams.

14. The system of claim 1, wherein the waveguide comprises an elongate hollow chamber defined by two or more planar reflective elements, and wherein the waveguide is configured to allow the two or more optical input beams to pass from the inlet to the outlet through the hollow chamber.

15. The system of claim 1, wherein the waveguide is configured as a self-imaging waveguide comprised of planar reflective surfaces having substantially equal lengths that are an integer fraction of the self-imaging length of the waveguide.

16. The system of claim 1, wherein the combined optical output beam has a power of greater than or equal to about one kilowatt (kW).

17. A method of steering at least one of two or more optical input beams and coherently combining the two or more optical input beams into an optical output beam, the method comprising:
  receiving two or more optical input beams, each having a phase;
  adjusting the phase of at least one of the two or more optical input beams using one or more phase controlling devices;
  steering at least one of the two or more optical input beams laterally, angularly, or laterally and angularly;
  combining the two or more optical input beams using a waveguide; and
  producing at an outlet of the waveguide a combined optical output beam that is coherent and is angularly steered, laterally steered, or angularly and laterally steered.

18. The method of claim 17, further comprising:
  detecting the combined optical output beam; and
  controlling the steering of the at least one of the two or more optical input beams laterally, angularly, or laterally and angularly, based on the detection.

19. The method of claim 17, wherein the step of producing comprising producing the combined optical output beam that is angularly steered less than or equal to about one degree.

* * * * *